US008929897B2

(12) United States Patent
Martin et al.

(10) Patent No.: US 8,929,897 B2
(45) Date of Patent: Jan. 6, 2015

(54) METHOD AND APPARATUS FOR PROVIDING IMPROVED MOBILITY PROCEDURE

(71) Applicant: Broadcom Corporation, Irvine, CA (US)

(72) Inventors: Brian Martin, Farnham (GB); Keiichi Kubota, Weybridge (GB)

(73) Assignee: Broadcom Corporation, Irvine, CA (US)

( * ) Notice: Subject to any disclaimer, the term of this patent is extended or adjusted under 35 U.S.C. 154(b) by 50 days.

(21) Appl. No.: 13/752,562

(22) Filed: Jan. 29, 2013

(65) Prior Publication Data

US 2013/0210437 A1 Aug. 15, 2013

Related U.S. Application Data

(60) Provisional application No. 61/592,377, filed on Jan. 30, 2012.

(30) Foreign Application Priority Data

Oct. 29, 2012 (GB) .................................. 1219411.4

(51) Int. Cl.
*H04W 36/00* (2009.01)
*H04W 24/10* (2009.01)
*H04W 36/30* (2009.01)

(52) U.S. Cl.
CPC .............. *H04W 24/10* (2013.01); *H04W 36/30* (2013.01); *H04W 36/0083* (2013.01)
USPC ........ 455/437; 455/434; 455/435.2; 455/509; 455/525; 455/425; 370/331; 370/338

(58) Field of Classification Search
USPC ...................... 455/432.1–444, 509–515, 525, 455/450–453, 422.1–425, 67.11–67.16; 370/331–333
See application file for complete search history.

(56) References Cited

U.S. PATENT DOCUMENTS 6,112,095 A 8/2000 Wax et al.
6,466,790 B2 * 10/2002 Haumont et al. ............. 455/437
(Continued)

FOREIGN PATENT DOCUMENTS

EP 2410792 A1 1/2012
WO WO-2008/051466 A2 5/2008
(Continued)

OTHER PUBLICATIONS

International Search Report and Written Opinion for Application No. PCT/IB2012/002047; dated Feb. 28, 2013.

(Continued)

*Primary Examiner* — Sharad Rampuria
(74) *Attorney, Agent, or Firm* — Stanton IP Law

(57) ABSTRACT

A method, apparatus and computer program product are provided in order to provide measurement reports on a more timely basis. Additionally, the method, apparatus and computer program product may provide measurement reports without first having initiated a cell reselection process. As such, the network entity, such as a radio network controller (RNC), may provide increased control in regards to the mobility procedure, such as cell redirection or handover, based at least in part upon the measurement result. From the perspective of a mobile terminal, one method includes receiving instructions to perform a cell update procedure based upon a new measurement. In response to obtaining the new measurement, the method also includes causing the cell update procedure to be triggered. In this regard, the cell update procedure includes provision of a cell update message that includes measurement results.

20 Claims, 8 Drawing Sheets

(56) References Cited

U.S. PATENT DOCUMENTS

| | | | |
|---|---|---|---|
| 7,079,988 B2 | 7/2006 | Albera et al. | |
| 8,305,997 B2* | 11/2012 | Virkki et al. | 370/332 |
| 8,509,797 B2* | 8/2013 | Johansson et al. | 455/452.1 |
| 8,543,117 B2* | 9/2013 | Martin et al. | 455/437 |
| 8,594,646 B2* | 11/2013 | Martin et al. | 455/418 |
| 8,774,133 B2* | 7/2014 | Chang et al. | 370/332 |
| 2003/0139183 A1* | 7/2003 | Rantalainen | 455/435 |
| 2007/0189259 A1 | 8/2007 | Sollenberger et al. | |
| 2009/0318144 A1* | 12/2009 | Thomas et al. | 455/434 |
| 2010/0003986 A1 | 1/2010 | Chen | |
| 2010/0111035 A1 | 5/2010 | Eskicioglu et al. | |
| 2011/0211476 A1* | 9/2011 | Benveniste et al. | 370/252 |
| 2011/0244858 A1* | 10/2011 | Callender | 455/436 |
| 2011/0269449 A1 | 11/2011 | Kazmi et al. | |
| 2012/0004010 A1* | 1/2012 | Tamura et al. | 455/525 |
| 2012/0236830 A1* | 9/2012 | Takano et al. | 370/331 |
| 2013/0150054 A1* | 6/2013 | Axmon et al. | 455/440 |
| 2013/0189991 A1* | 7/2013 | Rose et al. | 455/436 |

FOREIGN PATENT DOCUMENTS

| | | |
|---|---|---|
| WO | WO 2008/058150 A2 | 5/2008 |
| WO | WO-2009/039211 A1 | 3/2009 |
| WO | WO-2009/064553 A1 | 5/2009 |
| WO | WO-2010/031725 A1 | 3/2010 |
| WO | WO-2010/146229 A1 | 12/2010 |
| WO | WO 2011/038243 A2 | 3/2011 |
| WO | WO-2011/087516 A1 | 7/2011 |

OTHER PUBLICATIONS

Schreier, P.J., et al.; "*A Generalized Likelihood Ratio Test for Impropriety of Complex Signals*", IEEE Signal Processing Letters; vol. 13, No. 7; Jul. 2006.

Search and Examination Report for Application No. GB 1119437.0 dated Mar. 20, 2012.

Further Search Report for United Kingdom Application No. 1219411.4; dated Mar. 8, 2013.

Search Report for United Kingdom Application No. 1219411.4; dated Mar. 7, 2013.

* cited by examiner

METHOD AND APPARATUS FOR PROVIDING IMPROVED MOBILITY PROCEDURE

TECHNOLOGICAL FIELD

An example embodiment relates generally to communications technology and, more particularly, to methods, apparatus and computer program products for facilitating a mobility procedure, such as cell redirection or handover.

BACKGROUND

A mobile terminal may be triggered to initiate a cell update procedure based upon any one of a plurality of predefined conditions as defined, for example, by the third generation partnership project (3GPP) TS 25.331. These predefined conditions include, for example, notification of a universal mobile telecommunications system (UMTS) terrestrial radio access network (UTRAN) after reentering a service area in the URA_PCH or CELL_PCH states, notification of the UTRAN of a radio link control (RLC) unrecoverable error on an acknowledged mode (AM) RLC entity or the like. Once triggered, the mobile terminal may transmit a message to the network. The network may, in turn, initiate a mobility procedure, such as a cell redirection or cell handover.

Measurement reports may be included within the cell update messages provided to the network. However, the measurement results included within these reports may not be timely and, as a result, may be out of date by having been obtained some time prior to the cell update message being provided to the network. By way of example, it has been proposed to include Evolved-UTRAN (E-UTRAN) measurement results in the random access channel (RACH) measurement results, which are appended to common control channel (CCCH) messages, including cell update messages. Alternatively, for a mobile terminal in a CELL_FACH state, it has been proposed to provide a measurement report on a more timely basis. As such, in an instance in which a mobile terminal were in a CELL_PCH or URA_PCH state, the mobile terminal would first need to perform a cell update to move to the CELL_FACH state prior to providing the measurement report.

Additionally, in an instance in which the measurement results obtained by a mobile terminal satisfy the reselection criteria, the mobile terminal may initiate cell reselection prior to providing the measurements or any other report to the network. As such, the network may be limited in regards to the control that the network may exercise in regards to cell reselection by the mobile terminal.

BRIEF SUMMARY

A method, apparatus and computer program product are therefore provided according to an example embodiment of the present invention in order to provide measurement reports on a more timely basis. Additionally, the method, apparatus and computer program product of an example embodiment of the present invention may provide measurement reports without first having initiated a cell reselection process. As such, the network entity, such as a radio network controller (RNC) or the like, may provide increased control in regards to the mobility procedure, such as cell redirection or handover, based at least in part upon the measurement result.

In one embodiment, a method is provided that includes receiving instructions to perform a cell update procedure based upon a new measurement. In response to obtaining the new measurement, the method of this embodiment also includes causing the cell update procedure to be triggered. In this regard, the cell update procedure includes provision of a cell update message that includes measurement results.

In another embodiment, an apparatus is provided that includes at least one processor and at least one memory including computer program code with the at least one memory and the computer program code being configured to, with the processor, cause the apparatus to at least receive instructions to perform a cell update procedure based upon a new measurement. In response to obtaining the new measurement, the at least one memory and the computer program code are configured to, with the processor, cause the apparatus of this embodiment to also cause the cell update procedure to be triggered. In this regard, the cell update procedure includes provision of a cell update message that includes measurement results.

In a further embodiment, an apparatus is provided that includes means for receiving instructions to perform a cell update procedure based upon a new measurement. In response to obtaining the new measurement, the apparatus of this embodiment also includes means for causing the cell update procedure to be triggered. In this regard, the cell update procedure includes provision of a cell update message that includes measurement results.

In yet another embodiment, a computer program product is provided that includes at least one non-transitory computer-readable storage medium having computer-readable program instructions stored therein with the computer-readable program instructions including program instructions configured to receive instructions to perform a cell update procedure based upon a new measurement. In response to obtaining the new measurement, the computer-readable program instructions of this embodiment also include program instructions configured to cause the cell update procedure to be triggered. In this regard, the cell update procedure includes provision of a cell update message that includes measurement results.

In one embodiment, a method is provided that includes causing instructions to be provided to perform a cell update procedure based upon a new measurement. The method of this embodiment also includes receiving a cell update message that includes measurement results. The method of this embodiment further includes causing a message to be provided that indicates that a mobility procedure, such as a cell redirection or a handover, should proceed at least partially based upon the measurement results.

In another embodiment, an apparatus is provided that includes at least one processor and at least one memory including computer program code with the at least one memory and the computer program code being configured to, with the processor, cause the apparatus to at least cause instructions to be provided to perform a cell update procedure based upon a new measurement. The at least one memory and the computer program code are configured to, with the processor, cause the apparatus of this embodiment to also receive a cell update message that includes measurement results. The at least one memory and the computer program code are also configured to, with the processor, cause the apparatus of this embodiment to cause a message to be provided that indicates that a mobility procedure, such as a cell redirection or a handover, should proceed at least partially based upon the measurement results.

In a further embodiment, an apparatus is provided that includes means for causing instructions to be provided to perform a cell update procedure based upon a new measurement. The apparatus of this embodiment also includes means for receiving a cell update message that includes measurement results. The apparatus of this embodiment further includes means for causing a message to be provided that indicates that a mobility procedure, such as a cell redirection or a handover, should proceed at least partially based upon the measurement results.

In yet another embodiment, a computer program product is provided that includes at least one non-transitory computer-readable storage medium having computer-readable program instructions stored therein with the computer-readable program instructions including program instructions configured to cause instructions to be provided to perform a cell update procedure based upon a new measurement. The computer-readable program instructions of this embodiment also include program instructions configured to receive a cell update message that includes measurement results. The computer-readable program instructions of this embodiment further include program instructions configured to cause a message to be provided that indicates that a mobility procedure, such as a cell redirection or a handover, should proceed at least partially based upon the measurement results.

In one embodiment, a method is provided that includes receiving an indication of one or more frequency layers with one or more cells to be measured but not initially reselected. The method of this embodiment also includes obtaining measurement results for the one or more cells of the one or more frequency layers. Furthermore, the method of this embodiment includes causing a report to be provided that includes the measurement results without initiating a cell reselection process.

In another embodiment, an apparatus is provided that includes at least one processor and at least one memory including computer program code with the at least one memory and the computer program code being configured to, with the processor, cause the apparatus to at least receive an indication of one or more frequency layers with one or more cells to be measured but not initially reselected. The at least one memory and the computer program code are also configured to, with the processor, cause the apparatus of this embodiment to obtain measurement results for the one or more cells of the one or more frequency layers. Furthermore, the at least one memory and the computer program code are configured to, with the processor, cause the apparatus of this embodiment to cause a report to be provided that includes the measurement results without initiating a cell reselection process.

In a further embodiment, an apparatus is provided that includes means for receiving an indication of one or more frequency layers with one or more cells to be measured but not initially reselected. The apparatus of this embodiment also includes means for obtaining measurement results for the one or more cells of the one or more frequency layers. Furthermore, the apparatus of this embodiment includes means for causing a report to be provided that includes the measurement results without initiating a cell reselection process.

In yet another embodiment, a computer program product is provided that includes at least one non-transitory computer-readable storage medium having computer-readable program instructions stored therein with the computer-readable program instructions including program instructions configured to receive an indication of one or more frequency layers with one or more cells to be measured but not initially reselected. The computer-readable program instructions of this embodiment also include program instructions configured to obtain measurement results for the one or more cells of the one or more frequency layers. Furthermore, the computer-readable program instructions of this embodiment further include program instructions configured to cause a report to be provided that includes the measurement results without initiating a cell reselection process.

In one embodiment, a method is provided that includes causing an indication to be provided of one or more frequency layers with one or more cells to be measured but not initially reselected. The method of this embodiment also includes receiving a report that includes measurement results for the one or more cells of the one or more frequency layers. Further, the method of this embodiment includes causing a message to be provided that indicates that a mobility procedure, such as a cell redirection or a handover, should proceed at least partially based upon the measurement results.

In another embodiment, an apparatus is provided that includes at least one processor and at least one memory including computer program code with the at least one memory and the computer program code being configured to, with the processor, cause the apparatus to at least cause an indication to be provided of one or more frequency layers with one or more cells to be measured but not initially reselected. The at least one memory and the computer program code are also configured to, with the processor, cause the apparatus of this embodiment to receive a report that includes measurement results for the one or more cells of the one or more frequency layers. Further, the at least one memory and the computer program code are configured to, with the processor, cause the apparatus of this embodiment to cause a message to be provided that indicates that a mobility procedure, such as a cell redirection or a handover, should proceed at least partially based upon the measurement results.

In a further embodiment, an apparatus is provided that includes means for causing an indication to be provided of one or more frequency layers with one or more cells to be measured but not initially reselected. The apparatus of this embodiment also includes mean for receiving a report that includes measurement results for the one or more cells of the one or more frequency layers. Further, the apparatus of this embodiment includes means for causing a message to be provided that indicates that a mobility procedure, such as a cell redirection or a handover, should proceed at least partially based upon the measurement results.

In yet another embodiment, a computer program product is provided that includes at least one non-transitory computer-readable storage medium having computer-readable program instructions stored therein with the computer-readable program instructions including program instructions configured to cause an indication to be provided of one or more frequency layers with one or more cells to be measured but not initially reselected. The computer-readable program instructions of this embodiment also includes program instructions configured to receive a report that includes measurement results for the one or more cells of the one or more frequency layers. Further, the computer-readable program instructions of this embodiment also includes program instructions configured to cause a message to be provided that indicates that a mobility procedure, such as a cell redirection or a handover, should proceed at least partially based upon the measurement results.

BRIEF DESCRIPTION OF THE DRAWINGS

Figure 1:
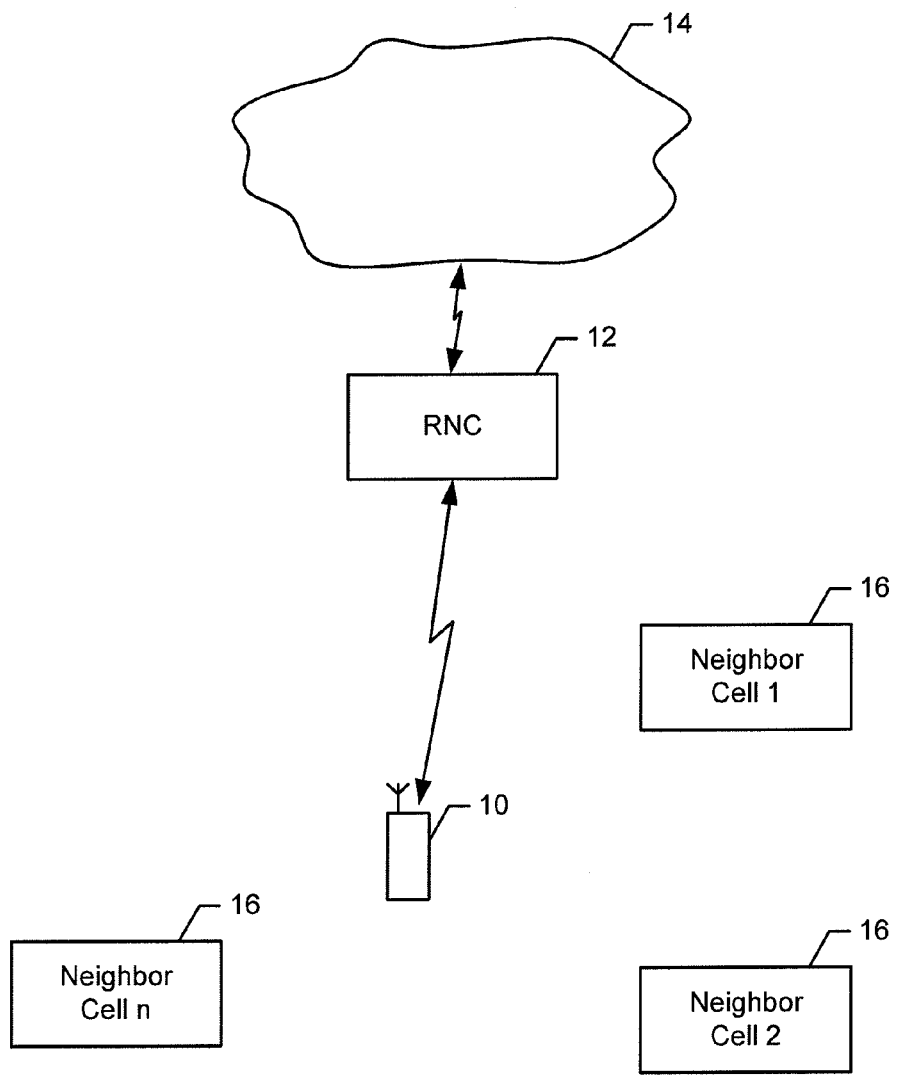
Figure 2:
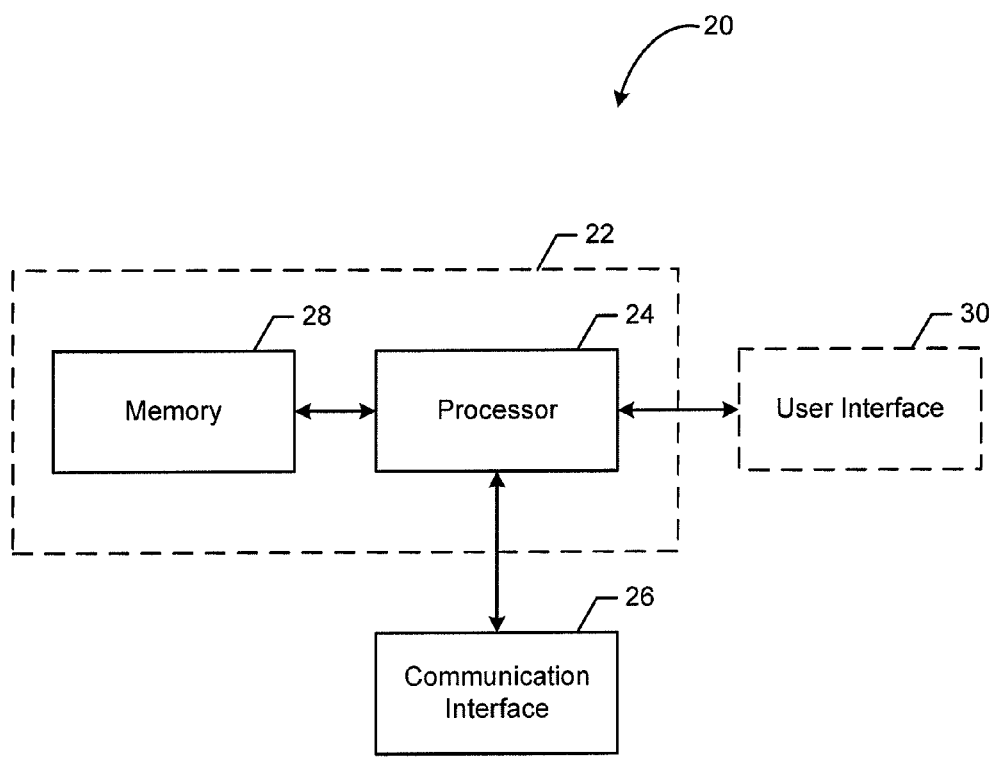
Figure 3:
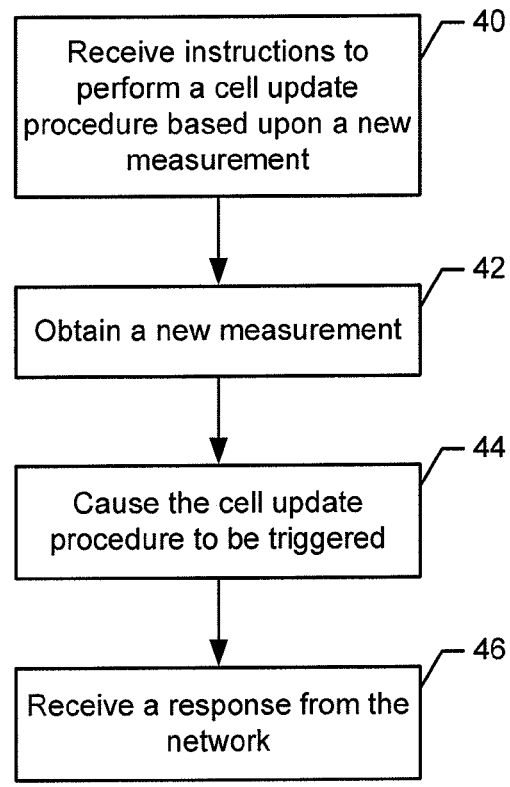
Figure 4:
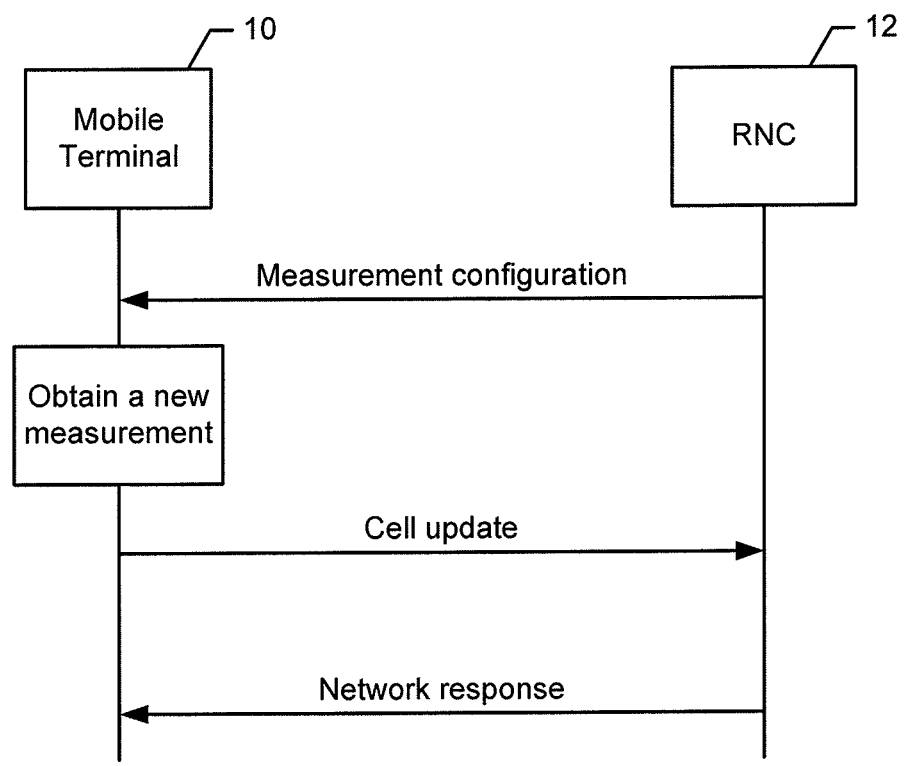
Figure 5:
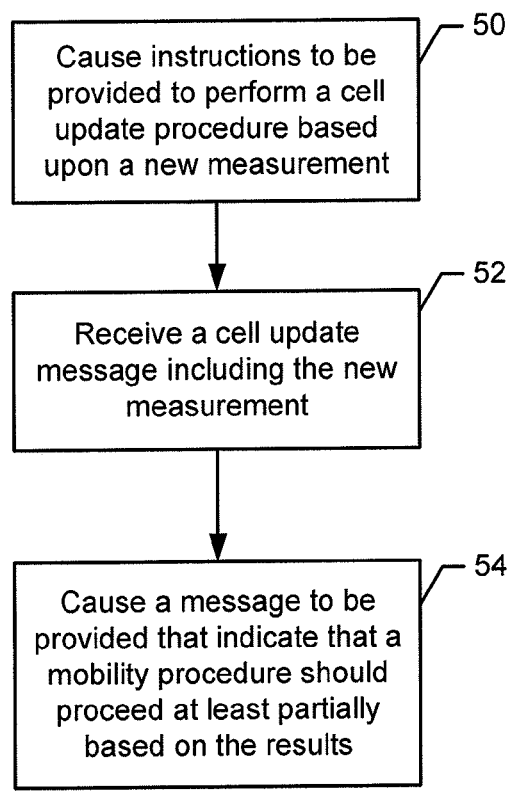
Figure 6:
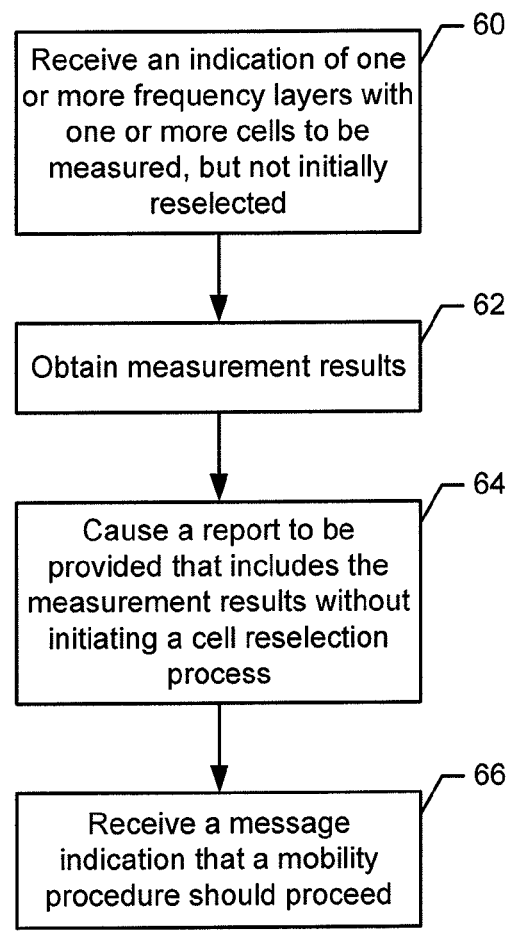
Figure 7:
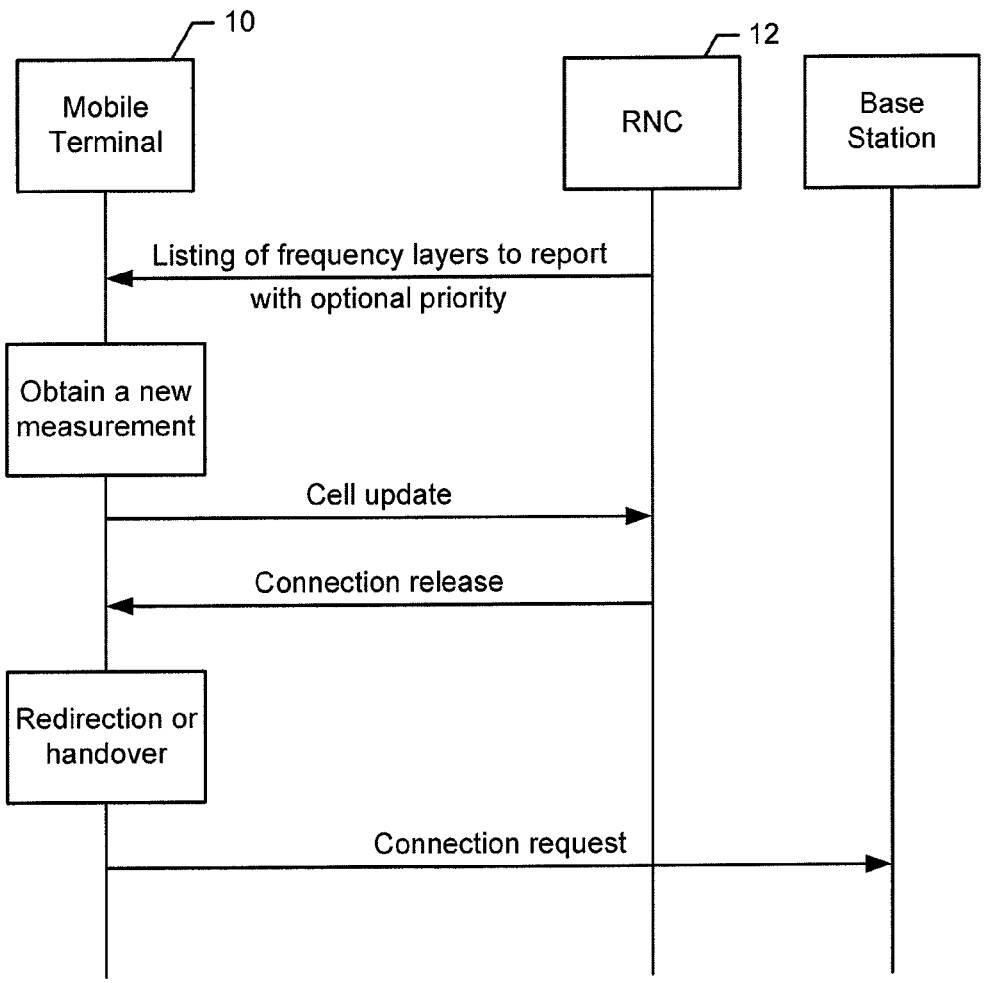
Figure 8:
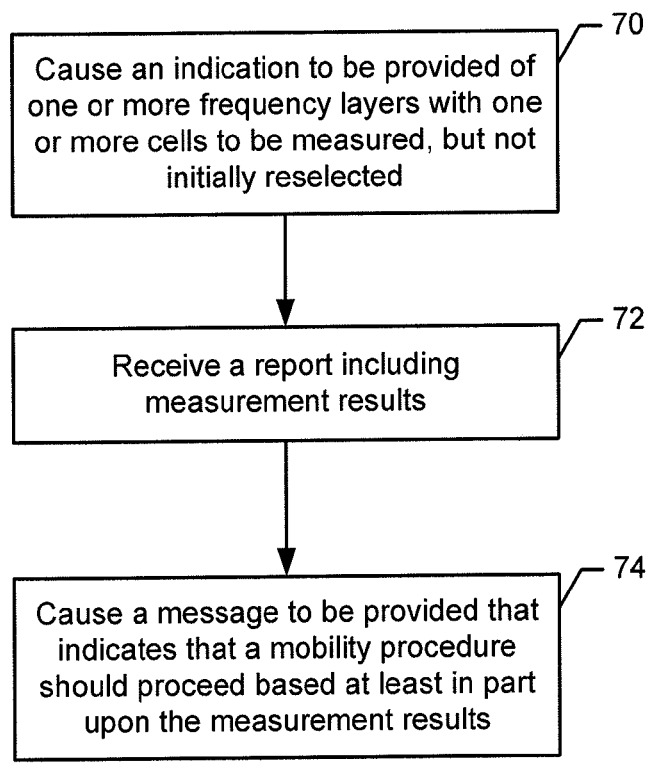

Having thus described certain embodiments of the invention in general terms, reference will now be made to the accompanying drawings, which are not necessarily drawn to scale, and wherein:

FIG. 1 is an illustration of a system that may be configured to support a mobility procedure, such as a cell redirection or a handover, in accordance with an example embodiment of the present invention;

FIG. 2 is a block diagram of an apparatus that may be specifically configured in order to perform the operations in accordance with an example embodiment of the present invention;

FIG. 3 is a flowchart illustrating the operations performed by an apparatus embodied by or otherwise associated with a mobile terminal in accordance with one example embodiment of the present invention;

FIG. 4 is a diagram illustrating the exchange of messages between a network entity, such as a radio network controller (RNC), and a mobile terminal in accordance with an example embodiment of the present invention;

FIG. 5 is a flowchart illustrating the operations performed from the perspective of a network entity, such an RNC, in accordance with an example embodiment of the present invention;

FIG. 6 is a flowchart illustrating the operations performed by an apparatus embodied by or otherwise associated with a mobile terminal in accordance with another example embodiment of the present invention;

FIG. 7 is a diagram illustrating the exchange of messages between the network entity, such as an RNC, and a mobile terminal in accordance with another example embodiment of the present invention; and FIG. 8 is a flowchart illustrating the operations performed from the perspective of a network entity, such as an RNC, in accordance with another example embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

A method, apparatus and computer program product are provided for providing an improved mobility procedure, that is, a procedure by which cell that supports or serves the mobile terminal 10 is changed, such as cell redirection or handover, or, in some instances, cell reselection. For example, a method, apparatus and computer program product of one embodiment may trigger a cell update procedure based upon the receipt of measurement results so as to provide the measurement results to a network entity, such as a radio network controller (RNC). As another example, a method, apparatus and computer program product of another embodiment may provide measurement results to a network entity, such as the RNC, without initiating cell reselection such that a determination may be made with respect to a mobility procedure, such as a cell redirection or a handover, based at least in part upon the measurement results. Although the method, apparatus and computer program product may be implemented in a variety of different systems, one example of such a system is shown in FIG. 1, which includes a mobile terminal 10 that is capable of communication with a network 14 (e.g., a core network) via, for example, an RNC 12. While the network may be configured in accordance with a Universal Mobile Telecommunications System (UMTS) Terrestrial Radio Access Network (UTRAN), the network may employ other mobile access mechanisms such as Long Term Evolution (LTE), LTE-Advanced (LTE-A), wideband code division multiple access (W-CDMA), CDMA2000, global system for mobile communications (GSM), general packet radio service (GPRS) and/or the like.

The network 14 may include a collection of various different nodes, devices or functions that may be in communication with each other via corresponding wired and/or wireless interfaces. For example, the network may include one or more base stations, such as one or more node Bs, evolved node Bs (eNBs), access points, relay nodes or the like, each of which may serve a coverage area divided into one or more cells. For example, the network may include one or more cells, including a serving cell including, for example, the RNC and one or more neighbor cells 16 (designated neighbor cell 1, neighbor cell 2, . . . neighbor cell n in the embodiment of FIG. 1), each of which may serve a respective coverage area. The serving cell and the neighbor cells could be, for example, part of one or more cellular or mobile networks or public land mobile networks (PLMNs). In turn, other devices such as processing devices (e.g., personal computers, server computers or the like) may be coupled to the mobile terminal and/or the second communication device via the network.

The mobile terminal 10 may be in communication with each other or other devices via the network 14. In some cases, each of the communication terminals may include an antenna or antennas for transmitting signals to and for receiving signals from a base station. In some example embodiments, the mobile terminal, also known as user equipment (UE) may be a mobile communication device such as, for example, a mobile telephone, portable digital assistant (PDA), pager, laptop computer, table computer, or any of numerous other hand held or portable communication devices, computation devices, content generation devices, content consumption devices, universal serial bus (USB) dongles, data cards or combinations thereof. As such, the mobile terminal may include one or more processors that may define processing circuitry either alone or in combination with one or more memories. The processing circuitry may utilize instructions stored in the memory to cause the mobile terminal to operate in a particular way or execute specific functionality when the instructions are executed by the one or more processors. The mobile terminal may also include communication circuitry and corresponding hardware/software to enable communication with other devices and/or the network 14.

The mobile terminal 10 and a network entity, such as an RNC 12, may implement an example embodiment of the method, apparatus and computer program product in order to provide for an improved mobility procedure, such as a cell redirection or a handover. In this regard, the mobile terminal 10 and a network entity, such as the RNC 12, may each embody or otherwise be associated with an apparatus 20 that is generally depicted in FIG. 2 and that may be configured in accordance with an example embodiment of the present invention as described below, such as in conjunction with FIGS. 3 and 6 from the perspective of the mobile terminal and FIGS. 5 and 8 from the perspective of a network entity, such as the RNC. However, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with a processing system including, for example, processing circuitry 22 that is configurable to perform actions in accordance with an example embodiment described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry may include a processor 24 and memory 28 that may be in communication with or otherwise control a communication interface 26 and, in some cases in which the apparatus is embodied by the mobile terminal 10, a user interface 30. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal or a network entity, such as an RNC 12, the processing circuitry may be embodied as a portion of mobile terminal or the network entity.

The user interface 30 (if implemented in embodiments of the apparatus 20 embodied by the mobile terminal 10) may be in communication with the processing circuitry to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms. In one embodiment, the user interface includes user interface circuitry configured to facilitate at least some functions of the user equipment by receiving user input and providing output.

The communication interface 26 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network 14 and/or any other device or module in communication with the processing circuitry, such as between the mobile terminal 10 and a network entity, such as an RNC 12. In this regard, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 28 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 28 or otherwise accessible to the processor. As such, whether configured by hardware or by a combination of hardware and software, the processor may represent an entity (e.g., physically embodied in circuitry—in the form of processing circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

FIGS. 3, 5, 6 and 8 are flowcharts illustrating the operations performed by a method, apparatus and computer program product, such as apparatus 20 of FIG. 3, from the perspective of the mobile terminal 10 in regards to FIGS. 3 and 6 and a network entity, such as an RNC 12, in regards to FIGS. 5 and 8 in accordance with one embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a non-transitory memory 28 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIGS. 3, 5, 6 and 8, when executed, convert a computer or processing circuitry into a particular machine configured to perform an example embodiment of the present invention. Accordingly, the operations of FIGS. 3, 5, 6 and 8 define an algorithm for configuring a computer or processing circuitry, e.g., processor, to perform an example embodiment. In some cases, a general purpose computer may be provided with an instance of the processor which performs the algorithm of FIGS. 3, 5, 6 and 8 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

In some embodiments, certain ones of the operations above may be modified or further amplified as described below. It should be appreciated that each of the modifications, optional additions or amplifications below may be included with the operations above either alone or in combination with any others among the features described herein. In this regard, Referring now to FIG. 3, the operations performed in order to trigger a cell update procedure based upon the receipt of measurement results so as to provide the measurement results to a network entity, such as the RNC 12, are illustrated. In this regard, an apparatus 20 embodied by or otherwise associated with the mobile terminal 10 may include means, such as the processing circuitry 22, the processor 24, communications interface 26 or the like, for receiving instructions to perform a cell update procedure based upon a new measurement which may be obtained by the mobile terminal. See operation 40. The instructions may be received from the network entity, such as the RNC, in various manners as indicated by the Measurement configuration message of FIG. 4. In one embodiment, the instructions may be received as part of the system information (SI). In another embodiment, the instructions may be received as part of a reconfiguration message, such as a radio bearer reconfiguration message.

The apparatus 20 embodied or otherwise associated with the mobile terminal 10 may include means, such as the processing circuitry 22, the processor 24 or the like, for obtaining a new measurement of one or more cells. See operation 42 of FIG. 3. In an example embodiment, the measurements may be obtained in accordance with the measurement rules for cell reselection even though the resulting measurements are reported to a network entity and are not utilized for cell reselection with cell reselection based upon the measurements instead being prevented, as described below. The mobile terminal may be in various states while obtaining the new measurements. For example, the mobile terminal may be in a CELL_FACH state, a URA_PCH state or a CELL_PCH state. The measurements may provide an indication of various parameters indicative of signal strength including, for example, measurements indicative of the power level, such as the reference signal received power (RSRP), and/or measurements indicative of signal quality, such as reference signal received quality (RSRQ). Regardless of the parameter(s) that are monitored, the apparatus, such as the processing circuitry or the processor, embodied or otherwise associated with the mobile terminal may obtain various types of measurements. For example, the apparatus, such as the processing circuitry or the processor, embodied or otherwise associated with the mobile terminal may include measurement results of cells in a E-UTRAN, measurement results of closed subscriber group (CSG) cells based upon, for example, an autonomous search, inter-frequency measurements, minimization of drive tests (MDT) measurement results, traffic volume measurement results or the like. In one embodiment, the instructions provided by the network entity, such as the RNC 12, may define the type of measurement results that are to be obtained by the mobile terminal.

In response to obtaining a new measurement, such as a new measurement that satisfies a predefined criteria in accordance with one example embodiment, the apparatus 20 embodied or otherwise associated with the mobile terminal 10 may include means, such as the processing circuitry 22, the processor 24, the communications interface 26 or the like, for causing the cell update procedure to be triggered. See operation 44 of FIG. 3. In this regard and as shown in FIG. 4, the cell update procedure may include the provision of a cell update message that includes measurement results for reception by a network entity, such as the RNC 12. The measurement results may be provided in various manners including, in one embodiment, being included in a random access channel (RACH) information element (IE). In one embodiment, the RACH IE may include an extension in order to include the measurement results. The cell update message may also include the cause of the cell update message, such as by including an indication that the cell update message is provided in response to the mobile terminal having obtained a new measurement. While a cell update procedure may be triggered for various reasons, the method, apparatus and computer program product of an example embodiment provide for a cell update procedure to be triggered by the receipt of new measurement results, regardless of whether the other reasons triggering a cell update procedure are satisfied.

As shown in operation 46 of FIG. 3, the apparatus 20 embodied by or otherwise associated with the mobile terminal 10 may also include means, such as the processing circuitry 22, the processor 24, the communications interface 26 or the like, for receiving a response from a network entity, such as the RNC 12, based upon the cell update message. See also the Network response message of FIG. 4 which may be, for example, a cell update confirm message, an RRC connection release message, etc. The network response may, in some embodiments, direct the mobile terminal to continue to communicate with the serving cell, thereby not performing any type of mobility procedure, that is, no cell reselection, cell redirection or handover, based upon the most recent measurement results. Alternatively, the network response may direct the mobile terminal to perform a mobility procedure, such as a cell redirection or a handover, based upon the measurement results. For example, in regards to a cell update that includes E-UTRAN measurement results, the network response may be an RRC connection release message that includes information relating to the redirection of the mobile terminal to a E-URAN cell. Alternatively, the network response may be a cell update confirm response which may cause the mobile terminal to transition to a CELL_DCH state such that the mobile terminal may then proceed in regards to cell reselection in accordance with existing packet switched (PS) handover procedures. Still further, the network response may be a cell change order or other type of reconfiguration message for providing information or direction to the mobile terminal regarding a potential mobility procedure, such as a cell reselection, a cell redirection or a handover, based upon the measurement results.

With reference now to FIG. 5, the operations performed by an apparatus 20 embodied by or otherwise associated with a network entity, such as the RNC 12, in conjunction with the provision of measurement results as described above in conjunction with FIGS. 3 and 4 are illustrated. In this regard, the apparatus embodied by or otherwise associated with a network entity, such as the RNC, may include means, such as the processing circuitry 22, the processor 24, the communications interface 26 or the like, for causing instructions to be provided to a mobile terminal 10 to perform a cell update procedure based upon a new measurement that is to be obtained by the mobile terminal. See operation 50 of FIG. 5. The apparatus embodied or otherwise associated with the network entity, such as the RNC, may also include means, such as the processing circuitry, the processor, the communications interface or the like, for receiving a cell update message that includes the measurement results, as described above. See operation 52 of FIG. 5.

The apparatus 20 embodied by or otherwise associated with a network entity, such as the RNC 12, may then determine if a mobility procedure, such as cell reselection, cell redirection or a handover, is appropriate based upon the measurement results. If it is determined that a mobility procedure is appropriate, the apparatus embodied by or otherwise associated with a network entity, such as the RNC, may include means, such as the processing circuitry 22, the processor 24, the communication interface 26 or the like, for causing a message to be provided to the mobile terminal 10 that indicates that the mobility procedure, such as cell redirection or handover, should proceed. See operation 54 of FIG. 5. As described above in conjunction with operation 46 of FIG. 3, the message provided by the network entity, such as the RNC, may take various forms depending upon the type of measurement results and the instructions to be provided by the network entity to the mobile terminal. By triggering the cell update procedure based upon the receipt of a new measurement by the mobile terminal, the measurement results may be provided to a network entity, such as the RNC. As such, the network entity, such as the RNC, may determine if a mobility procedure, such as a cell redirection or a handover, is appropriate based upon relatively recent measurement results.

With reference now to FIG. 6, the operations performed by a method, apparatus and computer program product of one embodiment are illustrated in order to provide measurement results to a network entity, such as the RNC 12, without initiating cell reselection such that a determination may be made with respect to a mobility procedure based at least in part upon the measurement results. In this regard, an apparatus 20 embodied by or associated with a mobile terminal 10 may include means, such as the processing circuitry 22, the processor 24, the communications interface 26 or the like, for receiving an indication of one or more frequency layers, e.g., frequencies in UTRAN, E-UTRAN, global system for mobile communications (GSM)/Edge radio access network (GE-RAN), etc., with one or more cells to be measured, but not initially reselected. See operation 60 of FIG. 6 as well as the Listing provided by the RNC in FIG. 7. The indication may be received in various manners, but may be included in a system information block (SIB), e.g., SIB 19, in one embodiment. Although the cell(s) of the frequency layer(s) identified in accordance with this example embodiment of the present invention are to be measured, but not reselected, at least not initially, the mobile terminal may be otherwise configured to monitor other cells, such as of other frequency layers, and may, in one embodiment, immediately reselect one of the other cells based upon its measurement results. In one embodiment, the indication of the one or more frequency layers that is received may also include an indication as to the relative priority with which the respective frequency layers are to be measured. Although various indications of priority may be utilized, examples of priority may include absolute priority, high priority, equal priority and low priority.

The apparatus 20 embodied by or associated with the mobile terminal may also include means, such as the processing circuitry 22, the processor 24 or the like, for obtaining measurement results from the one or more cells of the one or more frequency layers. See operation 62 of FIG. 6. In this regard, the apparatus, such as the processing circuitry or the processor, may obtain the measurement results in accordance with the relative priority assigned to the one or more cells of a respective frequency layer. For example, the measurement results for cells of a respective frequency layer having an absolute or high priority may be obtained more frequently than the periodicity with which other measurement results are obtained for the cells of other frequency layers with lower priority. As another example, the measurement results for cells of frequency layers that have an average or low priority may be obtained at an equal rate or lower rate, respectively, as compared to other cells for which measurement results are obtained.

The apparatus 20 embodied by or associated with the mobile terminal 10 may also include means, such as the processing circuitry 22, the processor 24, the communications interface 26 or the like, for causing a report to be provided to a network entity, such as the RNC 12, with the report including at least some of the measurement results, but without initiating a cell reselection process. See operation 64 of FIG. 6 as well as the cell update of FIG. 7. Various types of measurement results may be provided relating to signal strength including signal power, signal quality or the like. As such, a network entity, such as the RNC, may consider the measurement results prior to providing specific instructions with respect to the cell reselection process, if any. In this regard, the apparatus embodied by or associated with the mobile terminal may also include means, such as the processing circuitry, the processor, the communications interface or the like, for receiving a message indicating that a mobility procedure, such as a cell redirection, a handover or even cell reselection, should occur with respect to one cell of a respective frequency layer for which measurement results have been obtained and reported upon. See operation 66. The apparatus embodied by or otherwise associated with the mobile terminal may then effectuate the mobility procedure, such as cell redirection or a handover, in accordance with the message provided by the network entity. With reference to FIG. 7, for example, the RNC may provide the mobile terminal 10 with a Connection release message with, in one embodiment, target information, e.g., EUTRA target information. The mobile terminal of this embodiment may then initiate cell redirection (although a handover could be initiated in another embodiment) prior to sending a Connection request to the network, such as to a base station, to effectuate the cell redirection.

The apparatus 20, such as the processing circuitry 22 or the processor 24, may cause the measurement results to be reported in any of a variety of manners. For example, the apparatus, such as the processing circuitry or the processor, may be configured to provide the measurement results immediately or relatively soon following having obtained the measurement results. Alternatively, the apparatus, such as the processing circuitry or the processor, may cause the measurement results to be provided on a periodic or another predefined basis. Still further, the apparatus, such as the processing circuitry or the processor, of one embodiment may cause the measurement results to be provided in response to the satisfaction of a predefined criteria. For example, predefined criteria may be established with respect to cell reselection, that is, the conditions that must be satisfied to trigger cell reselection. Examples of the predefined criteria may include the satisfaction of a predefined threshold and/or the lapse of a predefined period of time, such as a predefined period of time from the network requesting measurements. While the predefined criteria may be established in various manners, the predefined criteria may be provided by the network entity, such as the RNC 12, such as in conjunction with the initial indication of the one or more frequency layers to be monitored.

Although cell reselection is not initiated immediately in response to the measurement results in accordance with this example embodiment, the apparatus 20, such as the processing circuitry 22 or the processor 24, may be configured to cause a report to be provided to a network entity, such as the RNC 12, that includes the measurement results in an instance in which the measurement result satisfies the predefined criteria related to cell reselection. The mobile terminal of this embodiment may then await a message from the network entity, such as the RNC, regarding a mobility procedure, such as cell reselection or a handover. As such, the network entity, such as the RNC, may provide increased control with respect to mobility procedures, such as a cell redirection or a handover, and may provide such increased control based upon additional information, such as the measurement results obtained by the mobile terminal 10, thereby allowing for more informed decisions to be made regarding the mobility procedure.

With reference now to FIG. 8, which illustrates the operations performed by a network entity, such as the RNC 12, in accordance with an example embodiment of the present invention, the apparatus 20 embodied by or otherwise associated with the network entity, such as the RNC, may include means, such as the processing circuitry 22, the processor 24, the communications interface 26 or the like, for causing an indication to be provided of one or more frequency layers with one or more cells to be measured, but not initially reselected. See operation 70 of FIG. 8. In this regard, initial reselection of a cell refers to the reselection of the cell by a mobile terminal 10 prior to having provided a measurement report to a network entity, such as RNC, and, in many embodiments, also receiving a message from the network entity, such as the RNC, triggering a mobility procedure.

The apparatus 20 embodied by or otherwise associated with the network entity, such as the RNC 12, may also include means, such the processing circuitry 22, the processor 24, the communications interface 26 or the like, for receiving a report from a mobile terminal 10 that includes measurement results for the one or more cells of the one or more frequency layers. See operation 72 of FIG. 8. As described above in conjunction with operation 64 of FIG. 6, the report that includes the measurement results may be provided in various forms and in various instances by the mobile terminal, such as following obtaining of the measurement report, in a periodic manner or upon satisfaction of a predefined criteria, such as the criteria for cell reselection which may have been provided by the network entity, such as the RNC, to the mobile terminal, such as in conjunction with the indication of the frequency layer(s) to be monitored in operation 70.

The apparatus 20 embodied by or otherwise associated with the network entity, such as the RNC 12, may then evaluate the measurement results and may determine if cell redirection, handover or other mobility procedure to one of the cells of a respective frequency layer is appropriate based at least in part upon the measurement results for the cell of the respective frequency layer. In an instance in which a mobility procedure is determined to be appropriate, the apparatus embodied by or otherwise associated with the network entity, such as the RNC, may include means, such as the processing circuitry 22, the processor 24, the communications interface 26 or the like, for causing a message to be provided, such as to the mobile terminal, that indicates that the mobility procedure, e.g., cell redirection or a handover, should proceed at least partially based upon the measurement results. See operation 74 of FIG. 8. This message may identify the cell to which the mobile terminal is to be redirected or handed over.

By making a determination as to a mobility procedure, such as a cell redirection or a handover, based upon measurement results of one or more cells of one or more frequency layers, the network entity, such as an RNC 12, may determine if a mobility procedure is appropriate in a more informed manner.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for operating a mobile terminal comprising:
receiving from a network, at the mobile terminal, an indication of one or more frequency layers with one or more cells to be measured;
obtaining measurement results for the one or more cells;
providing, from the mobile terminal to the network, a report that includes the measurement results;
refraining from initiating a cell reselection process when said measurement results satisfy predefined criteria for cell reselection; and
effectuating, by the mobile terminal in response to receiving a connection release message from a radio network controller (RNC) associated with the network, a cell reselection comprising a connection request message sent to an identified cell.

2. The method according to claim 1 wherein receiving the indication comprises receiving an indication of a priority of the one or more frequency layers according to which the respective frequency layers are to be measured.

3. The method according to claim 2 wherein obtaining the measurement results comprises obtaining the measurement results with a frequency that is based upon the priority of the one or more frequency layers.

4. The method according to claim 1 wherein obtaining the measurement results comprises obtaining measurements of signal strength of the one or more cells of the one or more frequency layers.

5. The method according to claim 1, wherein the mobile terminal is configured for use in a Long Term Evolution (LTE) system.

6. The method according to claim 1, wherein the measurement results comprise at least one of:
a reference signal received power (RSRP) of the one or more cells of the one or more frequency layers; and
a reference signal received quality (RSRQ) of the one or more cells of the one or more frequency layers.

7. An apparatus comprising:
at least one processor;
at least one memory including computer program code, the at least one memory and the computer program code configured to, with the at least one processor, cause the apparatus at least to perform:
receive from a network, at the apparatus, an indication of one or more frequency layers with one or more cells to be measured;
obtain measurement results for the one or more cells;
provide, from the apparatus to the network, a report that includes the measurement results;
refrain from initiating a cell reselection process when said measurement results satisfy predefined criteria for cell reselection; and
effectuate, by the apparatus in response to receiving a connection release message from a radio network controller (RNC) associated with the network, a cell reselection comprising a connection request message sent to an identified cell.

8. The apparatus according to claim 7 wherein the at least one memory and the computer program code are configured to, with the at least one processor, cause the apparatus to receive the indication by receiving an indication of a priority of the one or more frequency layers according to which the respective frequency layers are to be measured.

9. The apparatus according to claim 8 wherein the at least one memory and the computer program code are configured to, with the at least one processor, cause the apparatus to obtain the measurement results by obtaining the measurement results with a frequency that is based upon the priority of the one or more frequency layers.

10. The apparatus according to claim 7 wherein the at least one memory and the computer program code are configured to, with the at least one processor, cause the apparatus to obtain the measurement results by obtaining measurements of signal strength of the one or more cells of the one or more frequency layers.

11. The apparatus according to claim 7 wherein the at least one processor and the at least one memory are embodied by a mobile terminal.

12. The apparatus according to claim 7 wherein the at least one processor and the at least one memory are configured for use in a Long Term Evolution (LTE) system.

13. The apparatus according to claim 7 further comprising user interface circuitry configured to facilitate at least some functions of the apparatus by receiving user input and providing output.

14. The apparatus according to claim 7, wherein the measurement results comprise at least one of:
a reference signal received power (RSRP) of the one or more cells of the one or more frequency layers; and
a reference signal received quality (RSRQ) of the one or more cells of the one or more frequency layers.

15. A non-transitory computer-readable memory having computer-executable program code portions stored therein, the computer-executable program code portions comprising program code instructions which, when executed by a mobile terminal, cause the mobile terminal at least to:
receive from a network, at the mobile terminal, an indication of one or more frequency layers with one or more cells to be measured;
obtain measurement results for the one or more cells;
provide, from the mobile terminal to the network, a report that includes the measurement results;
refrain from initiating a cell reselection process when said measurement results satisfy predefined criteria for cell reselection; and
effectuate, by the mobile terminal in response to receiving a connection release message from a radio network controller (RNC) associated with the network, a cell reselection comprising a connection request message sent to an identified cell.

16. The non-transitory computer-readable memory according to claim 15 wherein the program code instructions for receiving the indication comprise program code instructions which cause the mobile terminal at least to receive an indication of a priority of the one or more frequency layers according to which the frequency layers are to be measured.

17. The non-transitory computer-readable memory according to claim 16 wherein the program code instructions for obtaining the measurement results comprise program code instructions which cause the mobile terminal at least to obtain the measurement results with a frequency that is based upon the priority of the one or more frequency layers.

18. The non-transitory computer-readable memory according to claim 15, wherein the program code instructions for obtaining the measurement results comprises obtaining measurements of signal strength of the one or more cells of the one or more frequency layers.

19. The non-transitory computer-readable memory according to claim 15, wherein the measurement results comprise at least one of:
a reference signal received power (RSRP) of the one or more cells of the one or more frequency layers; and
a reference signal received quality (RSRQ) of the one or more cells of the one or more frequency layers.

20. The non-transitory computer-readable memory according to claim 15, wherein the mobile terminal is configured for use in a Long Term Evolution (LTE) system.

\* \* \* \* \*